Thomas A. Barr Jr.
Robert F. Mayo,
INVENTORS.

BY *Harry M. Saragovitz*
*Edward J. Kelly*
*Herbert Berl*
*J. Keith Fowler*

Dec. 3, 1968     T. A. BARR, JR., ET AL     3,414,192

POLYNOMIAL GAS FLOW REGULATOR SYSTEM

Filed Feb. 23, 1967     3 Sheets-Sheet 2

Thomas A. Barr Jr.
Robert F. Mayo,
INVENTORS.

United States Patent Office 3,414,192
Patented Dec. 3, 1968

3,414,192
POLYNOMIAL GAS FLOW REGULATOR SYSTEM
Thomas A. Barr, Jr., Huntsville, Ala., and Robert F. Mayo, Newport News, Va., assignors to the United States of America as represented by the Secretary of the Army
Filed Feb. 23, 1967, Ser. No. 619,127
6 Claims. (Cl. 235—200)

ABSTRACT OF THE DISCLOSURE

A gas flow regulator system including a plurality of pressure regulators in the form of tanks or programmable regulators connected in series by sonic orifices. Each regulator produces one term of a temporal polynomial. At least one of the regulators is supplied by a pressure source, and each regulator supplies pressure to the next succeeding regulator and to a common plenum line which has a sonic throttle on its output end.

Background of the invention

The present invention relates generally to a programmable gas flow rate system based on the mass flow principle of sonic orifices and on the polynomial approximation for a desired function. A gas flow regulator system according to the present invention yields improved regulation over prior art systems, e.g., a precision nozzle type system. Such a system is also more economical than known prior art systems. In the development of plasma facilities, the requirement exists for a gas flow regulator which can be adjusted to conform to a prescribed time-dependent program. For example, in the development of an 8,000 kw. plasma facility, there is a requirement for an exponentially increasing gas flow rate with a maximum start-to-end flow rate ratio of 1:100 with an adjustable running time between 5 and 10 seconds. A system according to this invention will satisfy such a requirement.

Summary of the invention

The present invention provides a gas flow regulator system which produces prescribed time-dependent mass flow rates. In the basic concept, a series of tanks are connected in series by sonic orifices of succeedingly smaller size. Each of the tanks supplies gas to a common plenum for delivery via a final sonic throttle, for example, to a plasma facility. Alternate systems based on the same concept and principles but using programmable regulators in lieu of the tanks also form a part of the invention.

Accordingly, it is an object of the invention to provide a gas flow regulator system that can be adjusted to conform to a prescribed time-dependent program.

Another object of the invention is to provide a gas flow rate system based on the mass flow limitation property of sonic orifices and on the polynomial approximation for a desired function.

Description of the preferred embodiments

Figure 1:
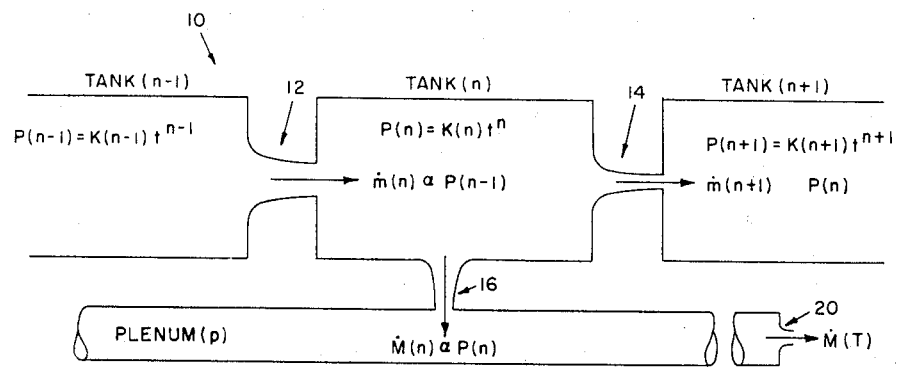
FIGURE 1 is a diagrammatic flow diagram illustrating one concept of the invention wherein a plurality of tanks are connected in series by sonic orifices for generation of a "polynomial" gas flow rate control system.

Referring in detail to the drawing, FIGURE 1, the basic concept of the invention is illustrated, wherein there is shown a typical "polynomial" mass flow rate control system 10. Regulator system 10 includes a plurality of tanks $(n-1)$ $(n)$, and $(n+1)$ connected in series by succeedingly smaller sonic orifices 12 and 14. Each succeeding tank is connected with a plenum $p$, as by an orifice 16. On the delivery end of the plenum is a "final" sonic throttle 20. Conditions for proper operation require that $\dot{m}(n+1)+\dot{M}(n)\ll \dot{m}(n)$. The gas enters the tank from the preceding tank on the left and is discharged to the succeeding tank on the right and also to the plenum $p$ below the tanks. The total mass flow rate of gas into the plenum from all tanks is proportional to the sum of the time-dependent pressures in the tanks. To produce an accurate mass flow rate from the plenum, $\dot{M}(T)$ must be much less than the least $\dot{M}(n)$.

Thus, in each tank the discharge orifice is much smaller than the input orifice so that when sonic flow conditions are established, the mass flow rate out of a given tank is small compared to the input rate. The mass flow rate relation is:

$$\dot{m}=CAPT^{-\frac{1}{2}} \qquad (1)$$

where $\dot{m}$ is the mass flow rate of gas moving through an orifice of area A with an orifice coefficient C. The upstream gas pressure and temperature are P and T, respectively. The mass of gas in a given tank is a function of time given by:

$$m(n)=\int_0^T [\dot{m}(n)-\dot{m}(n+1)-\dot{M}(n)]dt \approx \int_0^T \dot{m}(n)dt \qquad (2)$$

where $m$ is the mass of gas in a given tank labeled $n$, and $\dot{m}(n)$ is the flow rate of gas into and $\dot{m}(n+1)$ and $\dot{M}(n)$ are flows out of the tank. By substituting Equation 1 and $\dot{m}(n)$ in Equation 2 then, $$m(n) \approx \int_0^T CAP(n-1)[T(n-1)]^{-\frac{1}{2}} dt \qquad (2a)$$

Since the tanks are such that isothermal conditions prevail then $CA[T(n-1)]^{-\frac{1}{2}}$ may be taken to be a constant $G(n-1)$. Since $P(n-1)=K(n-1)t^{n-1}$, that is, the pressure in the supply tank increases according to an integral power of time so that $$\dot{m}(n) \approx G(n-1) \cdot K(n-1) \int_0^T t^{n-1} dt \qquad (2b)$$

or $$m(n) \approx G(n-1)K(n-1)t^n/(n-1) \qquad (2c)$$

Again, since isothermal conditions prevail, $P(n)$ is proportional to $\dot{m}(n)$ and the pressure in the $n$th tank is proportional to $t^n$ provided the pressure in the $n-1$ tank is proportional to $t^{n-1}$. Since the "zero tank" is a constant pressure source such as a fixed pressure supply line, then the pressure in the first tank will be proportional to the time $t$. The pressure in the second tank will be proportional to $t^2$, etc.

Figure 2:
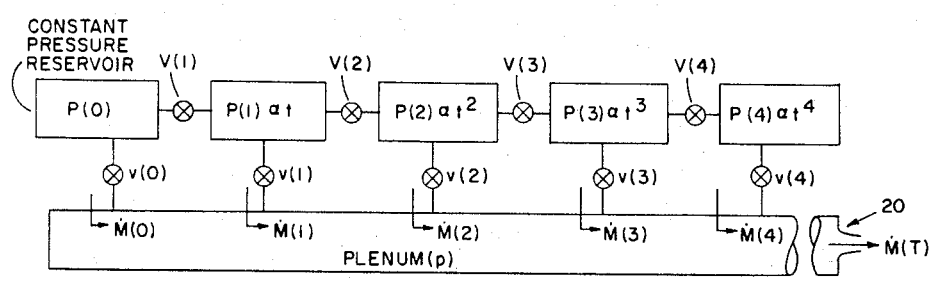
FIGURE 2 is a schematic arrangement of tanks illustrating an idealized fourth-degree polynomial gas mass flow rate system.

By tapping each of the tanks with small sonic orifices and discharging gas into a common plenum the mass flow rate of gas into the plenum will not materially change the pressure in the tank. The sum of all the mass flow rates will be $M(n)$, and the pressure at time $t$, which is proportional to the integral of this sum will be, $$P(p) = K(p) \int_0^T \sum \dot{M}(n) dt \quad (3)$$

where $(p)$ refers to the plenum (FIGURES 1 and 2). $\dot{M}(n)$ is the mass flow rate out of the $n$th tank into the plenum. The rate coefficient of the discharge, of the form $Q(n) = C(n)A[T(n)]^{-\frac{1}{2}}$, for the flow from each tank to the plenum shown in FIGURE 2, is determined by the setting of the sonic throttle valves $v(n)$. In general, the ideal gas law holds and $K(p) = V(p)RT(p)/MW$, where MW is the molecular weight of the gas being used. $\dot{M}(n) = Q(n)K(n)t^n$ by the same reasoning which was used to determine $\dot{m}(n)$. The "polynomial" characteristic of the mass flow rate regulator is apparent if Equation 3 is expanded and the value given for $M(n)$ is used:

$$P(p) = K(p) \int_0^T [Q(0)K(0) + Q(1)K(1)t + Q(2)K(2)t^2, \text{etc.}] dt \quad (4)$$

or $$P(p) = P(p, o) + K(p)[Q(o)K(o)t + Q(1)K(1)t^2/2 + Q(2)K(2)t^3/3, \text{etc.}] \quad (4a)$$

$P(p, o)$ is the value of the pressure in the plenum at $t=0$. FIGURE 2 shows a similar arrangement for a "polynomial" gas flow regulator. This arrangement is an idealized fourth degree polynomial gas mass flow rate system. The areas labeled with $P(n)$ are the tanks which receive gas through valves $V(n)$ on the left and discharge gas to the succeeding tank through valves $V(n+1)$ on the right and to the plenum below through valves $v(n)$. All valves are vernier controlled sonic throttles. The system is assumed to be isothermal, although a real system built on this principle may not be isothermal and may require compensating adjustments of the valves. The actual values of the polynomial coefficient are determined by the settings of the sonic throttles $V(n)$ and $v(n)$ and by the sizes of the tanks. A final sonic throttle 20 controls the mass flow rate $M(T)$ from the plenum. One restriction on a system of this type (FIGURES 1 and 2) limits its use to polynomials which have all positive coefficients since the gas flow from each throttle adds to the gas in the plenum. In some applications the tank system may not be practical because of the magnitude of the initial gas flow rate and the combination of large tank sizes and high pressures that may be required.

Figure 3:
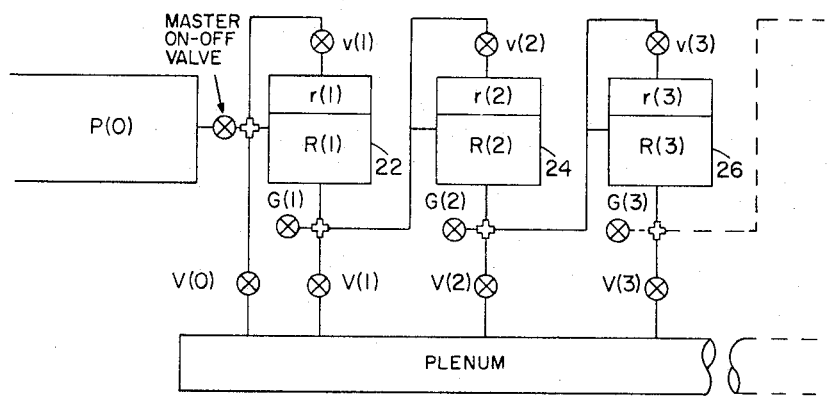
FIGURE 3 is a diagrammatic flow diagram of a modified system utilizing programmable pressure regulators in lieu of the tanks of FIGURES 1 and 2, this diagram illustrating three typical stages of a six-arc plasma facility.

In the embodiment of FIGURE 3, a pressure controlled regulator is substituted for each of the tanks of FIGURES 1 and 2. Hence, the three stage "polynomial" gas flow regulator includes a constant pressure air supply $P(o)$ and three programmable dome-type regulators 22, 24, and 26. Thus, a constant pressure reservoir $P(o)$ supplies pressure to the first regulator 22 of the series of regulators 22, 24, and 26. These regulators may be any commercially available, dome-type, programmable gas flow regulators. The regulators are shown with pressure control domes $r$ and regulator valve sections R. Valves V are sonic throttles which regulate the rate of gas discharge from each regulator into the receiver (plenum). Valves $v$ are sonic throttles used to control the rate of gas flow, and thereby the pressure, to the pressure control domes. In addition, a master on-off valve is provided for controlling the supply pressure from reservoir $P(o)$. Each of the valves $V(n)$ and $v(n)$ are vernier type valves. A pressure gage is connected in the outlet line of each regulator.

The arrangement of FIGURE 3 is typical, for example, for three of six stages of a control system for a parallel, six-arc, 8000-kw. plasma facility (not shown). The required program, in this case an exponential, is approximated by the sixth-degree polynomial regulator. Here the exponential approximation for the flow rate control equipment is $$A \exp. (\alpha t) \approx A[1 + (\alpha t) + (\alpha t)^2/2 + (\alpha t)^3/6 + (\alpha t)^4/24 + (\alpha t)^5/120 + (\alpha t)^6/720] \quad (6)$$

The polynomial terms are tabulated as functions of time, and the value of the polynomial as a function of time is determined. The individual gas pressures are measured at the gages G of FIGURE 3, and the total mass flow into the plasma facility test section is calculated from the pressure and the known size of the throat in the facility.

Figure 4:
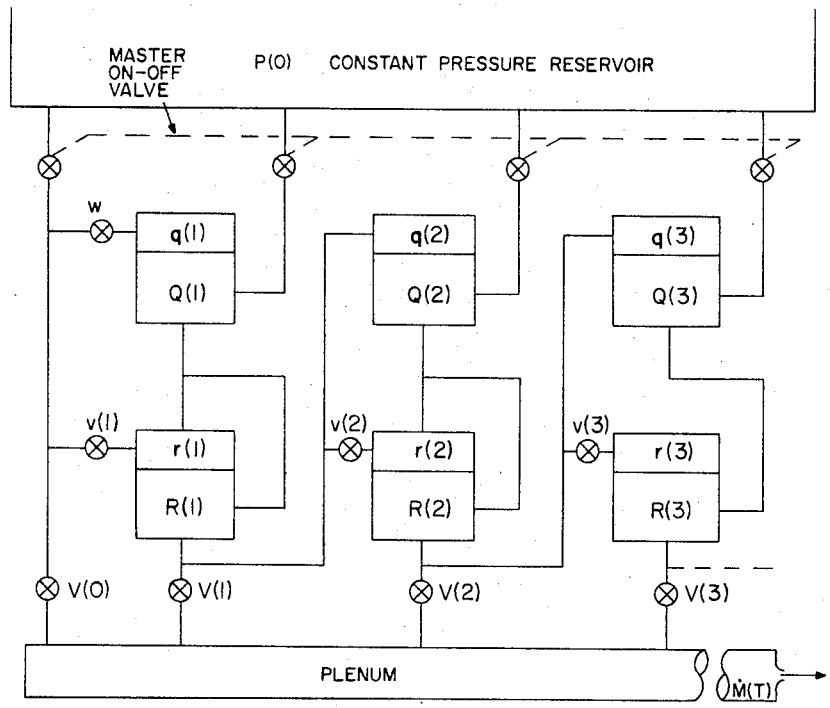
FIGURE 4 is a diagrammatic flow diagram of a polynomial regulator system similar to that of FIGURE 3 but using only one reservoir and having preregulation to limit the inlet pressure to each of the "polynomial" regulators.

The modified system shown in FIGURE 4 uses only one reservoir but has separate preregulation to limit the inlet pressure to each of the "polynomial" regulators. Thus, a "polynomial" regulator is provided with programmable input pressure system to reduce starting time delays. In this arrangement, the control pressures required to start the regulators to open may be kept low. The regulators Q, q are used to control the head pressure on the main control regulators R, r. Thus, the preregulators may be operated to produce variable inlet pressures on each of the regulators. These variable inlet pressures may be obtained in a manner similar to the output pressures from the regulators as shown in FIGURE 4. Such a system will essentially eliminate the characteristic error in the initial pressures required to start the regulator's operations, since the head pressures on the regulators may be kept to a minimum when the regulators start to open. When the system calls for higher flow rates, the head pressure preregulators will deliver higher pressures to the regulators.

Figure 5:
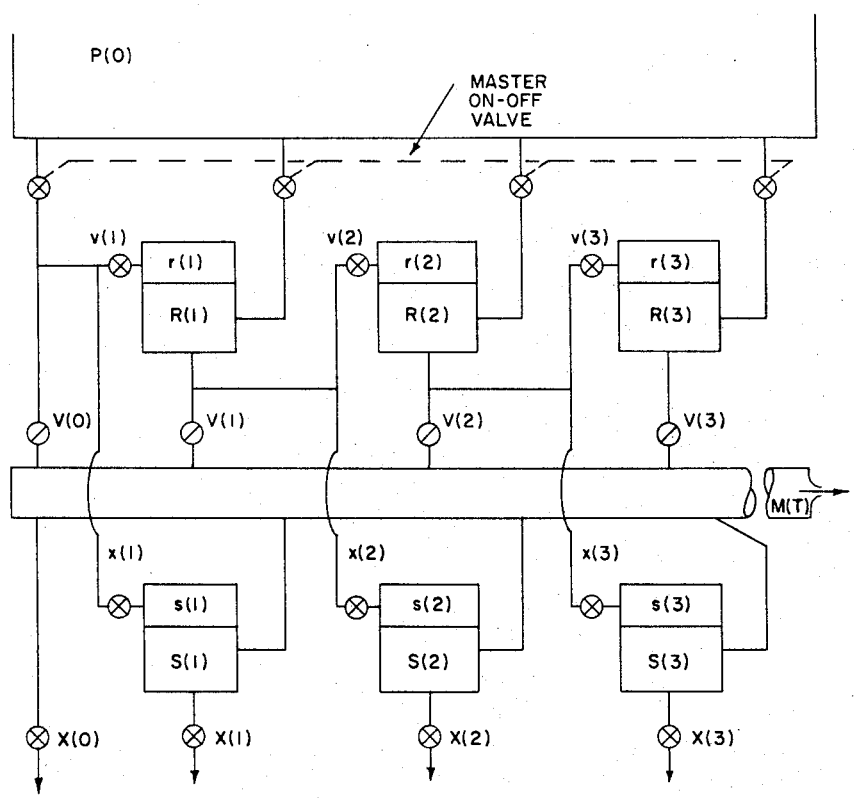
FIGURE 5 shows a regulator system which may be used to generate negative coefficient terms by bleeding off gas from the plenum.

FIGURE 5 illustrates a "polynomial" gas flow regulator system with positive and negative coefficients. Negative coefficient terms are generated by bleeding off gas from the plenum. The requirement in this case is that the negative coefficients cannot be generated unless the plenum chamber pressure meets sonic throat requirements, i.e., is about twice the discharge pressure. This system will produce a rising and falling gas flow rate within the limitation that pressure ratios across any of the valves remain high enough to maintain sonic throat conditions. This, in general, means that the lowest pressure in the plenum must be greater than two atmospheres, if the bleed-off regulators S, $s$ are discharging gas to the atmosphere through the sonic throttles X. The valves $x$ perform the same function on the regulators S, $s$ that the valves $v$ perform on the regulators R, $r$.

We claim:

1. A polynomial gas flow regulator system including: a plurality of pressure regulator means connected in series by sonic orifices; a source of fluid pressure connected to at least one of said regulator means for supplying pressure thereto; a plenum line; each of said regulator means further being connected with said plenum line by a sonic orifice; said plenum line having a final sonic throttle provided on the output end thereof.

2. A polynomial gas flow regulator system as set forth in claim 1 wherein said regulator means are defined by a plurality of tanks.

3. A polynomial gas flow regulator system as set forth in claim 2 wherein said regulator means further includes a first control valve disposed in the line connecting each tank output with the next succeeding tank, and a second control valve is disposed in the line connecting each tank and the common plenum line.

4. A polynomial gas flow regulator system as set forth in claim 1 wherein said regulator means are defined by a plurality of conventional, dome-type pressure regulators.

5. A polynomial gas flow regulator system as set forth in claim 4 wherein said regulator means further includes a first control valve in the line connecting each regulator output with the next succeeding regulator, and a second control valve is disposed in the line connecting each regulator and the common plenum line.

6. A polynomial gas flow regulator system as set forth in claim 1 wherein the fluid pressure source is a constant pressure reservoir and said regulator means includes a plurality of pairs of conventional, dome-type pressure regulators, the first regulator of each pair being connected with said reservoir, said first regulator being directly connected to the second regulator of each pair of regulators, each of the second regulators having an output line connected to the plenum and to both regulators of the next succeeding pair of regulators.

References Cited
UNITED STATES PATENTS

| | | | |
|---|---|---|---|
| 2,641,271 | 6/1953 | Pressler | 137—87 |
| 2,999,482 | 9/1961 | Bower | 121—38 |

RICHARD B. WILKINSON, *Primary Examiner.*

LAWRENCE R. FRANKLIN, *Assistant Examiner.*